United States Patent
Mikawa

(10) Patent No.: US 11,954,935 B2
(45) Date of Patent: Apr. 9, 2024

(54) ELECTRONIC DEVICE IMPROVED IN OBJECT DETECTION PERFORMANCE, IMAGE CAPTURING APPARATUS, METHOD OF CONTROLLING ELECTRONIC DEVICE, AND STORAGE MEDIUM

(71) Applicant: CANON KABUSHIKI KAISHA, Tokyo (JP)

(72) Inventor: Atsushi Mikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 330 days.

(21) Appl. No.: 17/365,102

(22) Filed: Jul. 1, 2021

(65) Prior Publication Data
US 2022/0027607 A1    Jan. 27, 2022

(30) Foreign Application Priority Data
Jul. 22, 2020   (JP) .................. 2020-125733

(51) Int. Cl.
*G06V 40/10*   (2022.01)
*G06F 18/21*   (2023.01)
*G06N 3/08*    (2023.01)

(52) U.S. Cl.
CPC ............ *G06V 40/10* (2022.01); *G06F 18/217* (2023.01); *G06N 3/08* (2013.01)

(58) Field of Classification Search
CPC ........ G06V 40/10; G06V 10/70; G06V 40/16; G06F 18/217; G06N 3/08; H04N 1/00183
See application file for complete search history.

(56) References Cited

U.S. PATENT DOCUMENTS

| | | | |
|---|---|---|---|
| 2010/0033591 A1* | 2/2010 | Kawaguchi | H04N 25/42 348/222.1 |
| 2011/0063236 A1* | 3/2011 | Arai | H04N 23/62 345/173 |
| 2020/0364471 A1* | 11/2020 | Park | G06T 7/0002 |
| 2021/0104159 A1* | 4/2021 | Tsai | G06V 40/173 |
| 2021/0127970 A1* | 5/2021 | Hirokawa | A61B 3/102 |
| 2021/0358629 A1* | 11/2021 | Wujek | G06T 7/0012 |
| 2021/0366613 A1* | 11/2021 | Schler | A61B 5/4088 |

FOREIGN PATENT DOCUMENTS

JP    2015219487 A    12/2015

* cited by examiner

*Primary Examiner* — Dhaval V Patel
(74) *Attorney, Agent, or Firm* — ROSSI, KIMMS & McDOWELL LLP

(57) ABSTRACT

An electronic device that is improved in object detection performance exhibited when executing a specific function. A system controller detects one or more objects from image data, evaluates feature values of the one or more detected objects, and identifies an object out of the one or more objects, that satisfies a predetermined criterion related to execution of a specific function, based on a result of the evaluation. The specific function is executed in a case where it is determined that the identified object satisfies an execution condition of the specific function.

15 Claims, 12 Drawing Sheets

(1) RECEIVE SPECIFIC OPERATION (2) TRANSMIT OBJECT IMAGE & RELEARNING REQUEST

100

102

(6) TRANSMIT OBJECT EVALUATION MODEL (7) UPDATE OBJECT EVALUATION MODEL (3) EXTRACT FEATURE VALUES FROM OBJECT IMAGE (4) ADD SET OF OBJECT IMAGE & TEACHER DATA TO LEARNING DATA SETS (5) PERFORM MACHINE LEARNING USING NEW LEARNING DATA SETS TO GENERATE OBJECT EVALUATION MODEL

FIG. 2
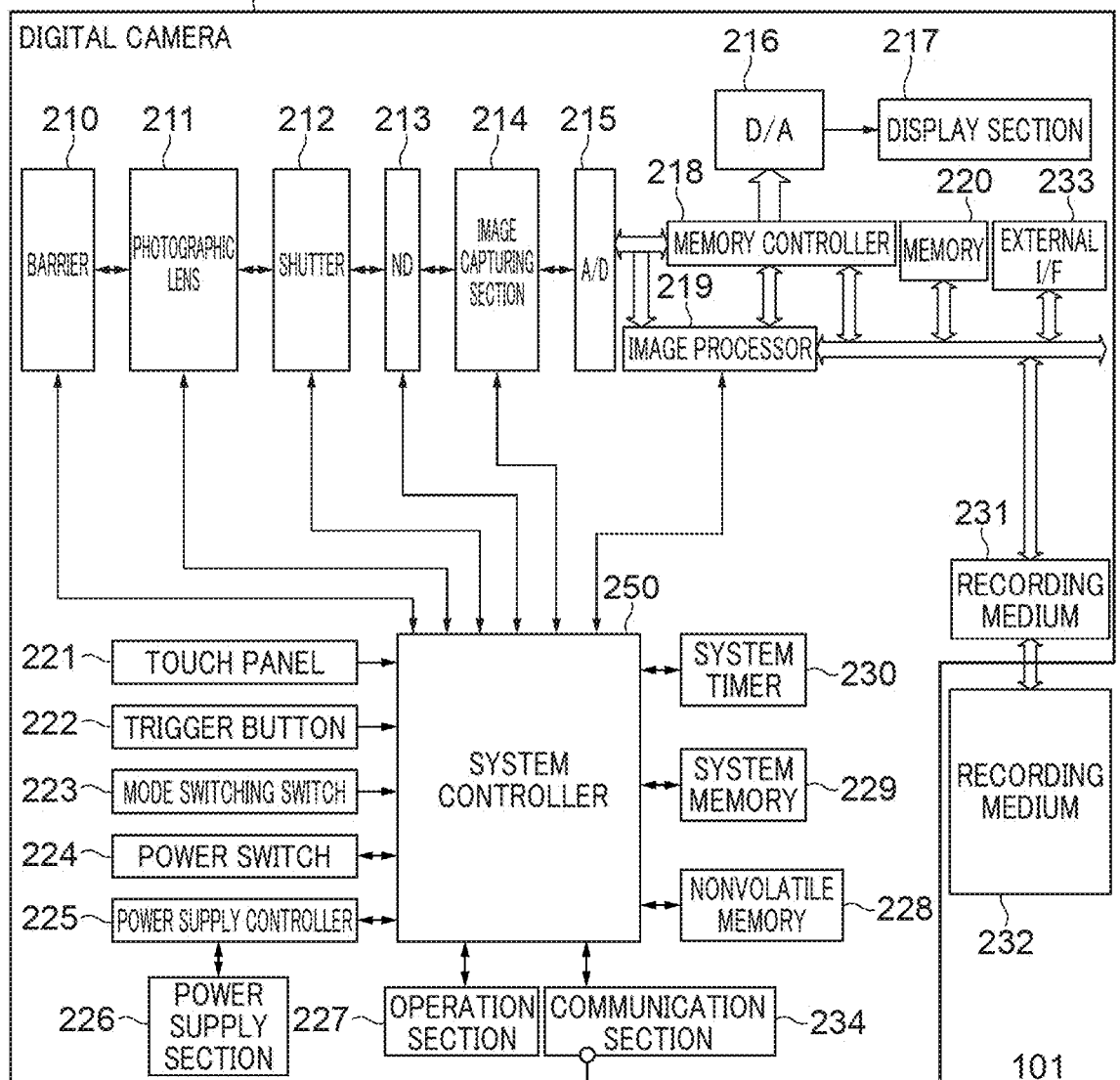
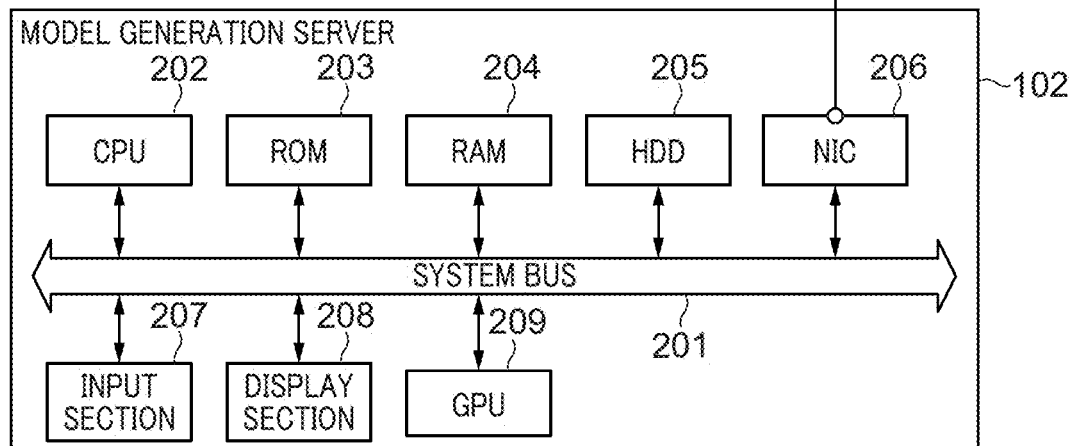

FIG. 5A
| | IMAGE | CORRECT ANSWER LABEL |
|---|---|---|
| DATA1 |  | 1 |
| DATA2 |  | 1 |
| DATA3 |  | 0 |
| DATA4 |  | 1 |
| DATA5 |  | 0 |
| DATA6 |  | 0 |

*FIG. 5B*
| | IMAGE | FEATURE VALUE 1 GLOSS OF HAIR | FEATURE VALUE 2 SHADE OF FACE | FEATURE VALUE 3 BRIGHTNESS OF PUPIL |
|---|---|---|---|---|
| DATA1 |  | 0.96 | 0.88 | 0.67 |
| DATA2 |  | 0.81 | 0.98 | 0.78 |
| DATA3 |  | 0.21 | 0.12 | 0.34 |
| DATA4 |  | 0.76 | 0.87 | 0.87 |
| DATA5 |  | 0.36 | 0.34 | 0.01 |
| DATA6 |  | 0.11 | 0.13 | 0.21 |

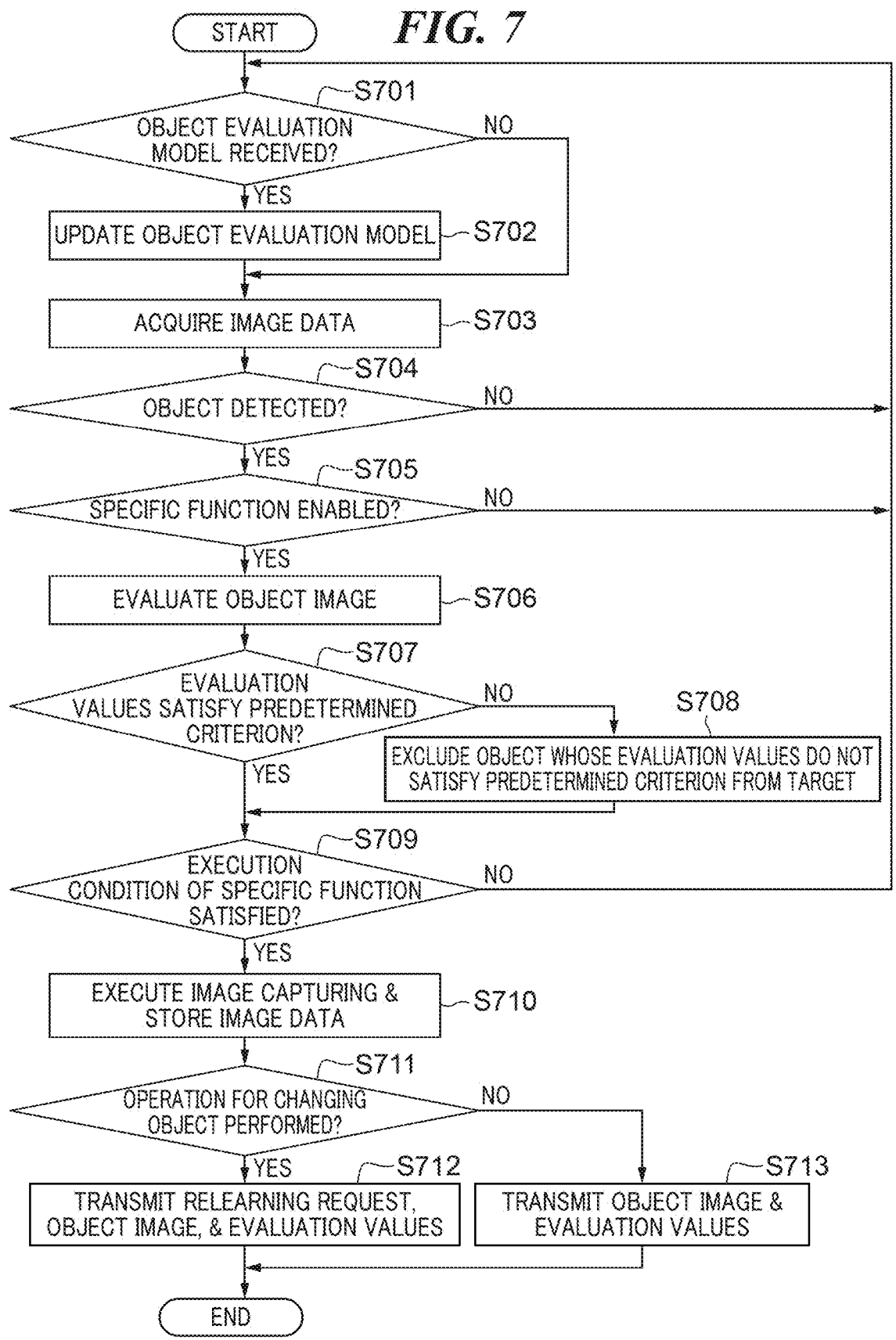

FIG. 9

| FUNCTION NAME | DETERMINATION PARAMETER 1 | DETERMINATION PARAMETER 2 |
|---|---|---|
| SMILE SHUTTER FUNCTION | GLOSS OF HAIR > 0.89 | BRIGHTNESS OF PUPIL > 0.65 |
| GROUP PHOTO MODE | SHADE OF FACE > 0.67 | GLOSS OF HAIR > 0.60 |
| WINK MOVING IMAGE START | BRIGHTNESS OF PUPIL > 0.77 | SHADE OF FACE > 0.62 |

ELECTRONIC DEVICE IMPROVED IN OBJECT DETECTION PERFORMANCE, IMAGE CAPTURING APPARATUS, METHOD OF CONTROLLING ELECTRONIC DEVICE, AND STORAGE MEDIUM

BACKGROUND OF THE INVENTION

Field of the Invention

The present invention relates to an electronic device that is improved in object detection performance exhibited when executing a specific function, an image capturing apparatus including the electronic device, a method of controlling the electronic device, and a storage medium.

Description of the Related Art

For example, some of digital cameras have a smile shutter function for automatically detecting a smile of a person as an object and automatically performing photographing when the smile of a person is detected. When photographing is performed using the smile shutter function, not only a person to be photographed, but also a poster having a face of a person printed thereon, etc., are sometimes detected as an object depending on a situation. At this time, there is a case where the face printed on the poster is detected by the digital camera due to the smile shutter function and photographing which is not intended by a user is performed. As a related art, there has been proposed a technique in Japanese Laid-Open Patent Publication (Kokai) No. 2015-219487. The proposed technique determines whether a detected face is a face of a main object or a face of another object, based on the area of the face within an image capturing screen and a distance to the object, and focuses on the main object or an object except the other object.

Here, according to the proposed technique, in a case where photographing using a specific function, such as the smile shutter function, is performed, there is a case where an object to be photographed is not properly detected depending on a photographing scene. For example, in a case where photographing is performed in a situation in which a face of a person to be photographed is put in a hole of a stand-in panel, such as a face-cutout panel having a life size, the face of the person also becomes planar with reference to the panel. For this reason, it is difficult for the proposed technique to detect a face of a person to be photographed based on the area of the face within an image capturing screen and a distance to the object. Further, in a case where there is a three-dimensionally formed object of a person in a photographing range of the image capturing apparatus, similarly, it is difficult for the proposed technique to distinguish between a face of a person to be photographed and a face of the formed object. In the cases described above, the accuracy of object detection in executing a specific function, such as the smile shutter function, is lowered.

SUMMARY OF THE INVENTION

The present invention provides an electronic device that is improved in object detection performance exhibited when executing a specific function, an image capturing apparatus including the electronic device, a method of controlling the electronic device, and a storage medium.

In a first aspect of the present invention, there is provided an electronic device including a detection unit configured to detect one or more objects from image data, an evaluation unit configured to evaluate feature values of the one or more detected objects, an identification unit configured to identify an object out of the one or more objects, that satisfies a predetermined criterion related to execution of a specific function, based on a result of the evaluation, and a control unit configured to perform control for executing the specific function in a case where it is determined that the identified object satisfies an execution condition of the specific function.

In a second aspect of the present invention, there is provided an image capturing apparatus including an image capturing section, and an electronic device, the electronic device including a detection unit configured to detect one or more objects from image data, an evaluation unit configured to evaluate feature values of the one or more detected objects, an identification unit configured to identify an object out of the one or more objects, that satisfies a predetermined criterion related to execution of a specific function, based on a result of the evaluation, and a control unit configured to perform control for executing the specific function in a case where it is determined that the identified object satisfies an execution condition of the specific function.

In a third aspect of the present invention, there is provided a method of controlling an electronic device, including detecting one or more objects from image data, evaluating feature values of the one or more detected objects, identifying an object out of the one or more objects, that satisfies a predetermined criterion related to execution of a specific function, based on a result of the evaluation, and performing control for executing the specific function in a case where it is determined that the identified object satisfies an execution condition of the specific function.

According to the present invention, it is possible to improve the object detection performance exhibited when executing a specific function.

Further features of the present invention will become apparent from the following description of exemplary embodiments (with reference to the attached drawings).

BRIEF DESCRIPTION OF THE DRAWINGS

FIG. 2 is a diagram showing hardware configurations of apparatuses that form the system.

FIGS. 5A and 5B are diagrams each showing an example of learning data sets.

FIG. 7 is a flowchart of a process performed by the digital camera.

FIG. 9 is a diagram showing an example of predetermined criterions associated with a plurality of functions, respectively.

DESCRIPTION OF THE EMBODIMENTS

The present invention will now be described in detail below with reference to the accompanying drawings showing embodiments thereof. However, the description of configurations of the following embodiments is given by way of example, and is by no means intended to limit the scope of the present invention to the described configurations.

Figure 1:
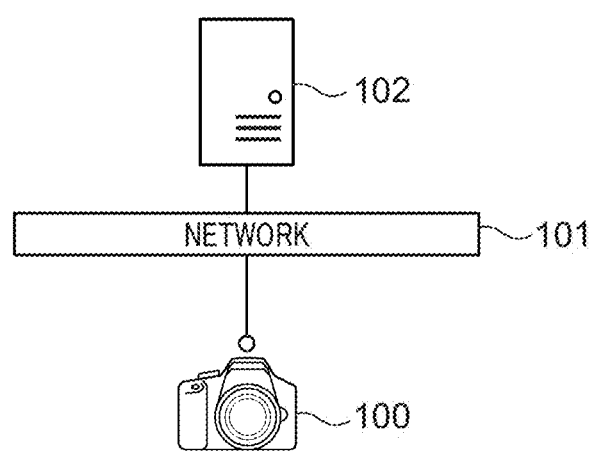
FIG. 1 is a diagram showing a configuration of the entire system.

FIG. 1 is a diagram showing a configuration of the entire system of the present embodiment. As shown in FIG. 1, a digital camera 100 and a model generation server 102 are connected via a network 101. The digital camera 100 is an image capturing apparatus. However, the image capturing apparatus of the present embodiment is not limited to the digital camera 100, but may be an electronic device, such as a smartphone, a tablet terminal, a personal computer, and a PDA. The model generation server 102 is a server apparatus that generates a learning model that estimates an object. The model generation server 102 may be a cloud server, an edge computer, or the like. The model generation server 102 may be implemented by a single computer or may be implemented by distributing functions thereof among a plurality of computers. Further, the model generation server 102 may be implemented by a smartphone, a tablet terminal, or the like.

The digital camera 100 photographs an object to acquire image data and extracts feature values from the image data. The digital camera 100 transmits the image data, or both of the image data and the feature values to the model generation server 102 via the network 101 such as the Internet. The model generation server 102 generates a learning model that estimates an object and transmits the generated learning model to the digital camera 100. Further, the digital camera 100 detects an object using the received learning model. In doing this, the digital camera 100 excludes an object which is not a target of photographing using a specific function from one or more detected objects. Then, the digital camera 100 determines a state of the object and executes photographing when an execution condition of the specific function, such as a smile shutter function, is satisfied.

FIG. 2 is a diagram showing hardware configurations of the apparatuses forming the system. First, the digital camera 100 will be described. The digital camera 100 includes a barrier 210, a photographic lens 211, a shutter 212, an ND (Neutral Density) filter 213, and an image capturing section 214, which form an image capturing system. The barrier 210 is a protection member for covering the image capturing system to thereby prevent the barrier 210, the photographic lens 211, the shutter 212, the ND filter 213, and the image capturing section 214 from being stained or damaged. The photographic lens 211 is a lens group including a zoom lens, a focus lens, and so forth. The shutter 212 has an aperture function. The ND filter 213 is used to reduce light when photographing. The image capturing section 214 is an image capturing device implemented e.g. by a CCD or CMOS device for converting an optical image to electrical signals (analog signals). An analog-to-digital converter 215 converts the analog signals output from the image capturing section 214 to digital signals.

An image processor 219 performs resizing, such as predetermined pixel interpolation and size reduction, color conversion processing, and so forth, on the digital signals output from the analog-to-digital converter 215 and data input from a memory controller 218. Further, the image processor 219 performs predetermined calculation processing using captured image data (digital signals). A system controller 250 performs exposure control, ranging control, and so forth based on a result of the calculation performed by the image processor 219. With this, AF (Auto Focus) processing and AE (Auto Exposure) processing using the TTL (Through The Lens) method, and EF (flash preliminary light emission) processing are performed. Further, the image processor 219 performs predetermined calculation processing using the captured image data and performs AWB (Auto White Balance) processing using the TTL method based on a result of the calculation.

Output data from the analog-to-digital converter 215 is written into a memory 220 via the image processor 219 and the memory controller 218, or via the memory controller 218. The memory 220 stores image data converted by the analog-to-digital converter 215, metadata recorded in association with image data, and image data to be displayed on a display section 217. The memory 220 has a sufficient storage capacity to store data of a predetermined number of still images and data of a predetermined duration of moving images (including voice data). Further, the memory 220 also functions as an image display memory (video memory). A digital-to-analog converter 216 converts the data for image display, stored in the memory 220, to analog signals and supplies the converted analog signals to the display section 217. With this, the image data for image display, stored in the memory 220, is displayed on the display section 217 via the digital-to-analog converter 216.

The display section 217 performs display on a display device, such as an LCD, according to the analog signals output from the digital-to-analog converter 216. The digital signals converted by the analog-to-digital converter 215 from analog to digital and accumulated in the memory 220 are converted by the digital-to-analog converter 216 from digital to analog and sequentially transferred to the display section 217. This causes the display section 217 to function as an electronic viewfinder and perform through image display (live view display (LV display)). A nonvolatile memory 228 is an electrically erasable and recordable memory. As the nonvolatile memory 228, an EEPROM or the like is applied. The nonvolatile memory 228 stores constants and programs for the operation of the system controller 250. The programs stored in the nonvolatile memory 228 are computer programs for executing the processes of the present embodiment.

The system controller 250 has at least one processor or circuit. The system controller 250 may have a GPU (graphics processing unit) for performing inference processing. The system controller 250 controls the overall operation of the digital camera 100. The system controller 250 corresponds to a detection unit, an evaluation unit, an identification unit, and a control unit. As a system memory 229, for example, a RAM is used. In the system memory 229, the constants and variables for the operation of the system controller 250, the programs read out from the nonvolatile memory 228, and so forth are loaded. The system controller 250 executes the programs loaded in the system memory 229, whereby the processes of the present embodiment are realized. Further, the system controller 250 performs display control by controlling the memory 220, the digital-to-analog converter 216, the display section 217, and so forth. A system timer 230 measures time used for various controls and time of a built-in clock.

A mode switching switch 223, a trigger button 222, and an operation section 227 are operation members for inputting various operation instructions to the system controller 250. The mode switching switch 223 generates a mode switching signal for switching an operation mode of the system controller 250. The system controller 250 switches the operation mode to one of a recording mode, a reproduction mode, and so forth, according to the mode switching signal. The trigger button 222 generates a trigger (release) signal for giving an instruction for photographing a still image and an instruction for starting or terminating moving image photographing to the system controller 250. The system controller 250 starts a series of operations of a photographing process and terminates the series of operations of the photographing process according to the trigger signal. The photographing process is a process for writing encoded image data which has been accumulated in the memory 220 via the image capturing section 214, the image processor 219, and the memory controller 218, in a recording medium 232. The digital camera 100 also includes a power button 224 for powering on or off.

Operation members of the operation section 227 have functions assigned thereto, on a scene-by-scene basis, e.g. according to selective operation of various function icons displayed on the display section 217, whereby the operation members act as various function buttons. Examples of the function buttons include an end button, a return button, an image scroll button, a jump button, a narrowing button, and an attribute changing button. For example, when a menu button is pressed, a menu screen on which various settings can be made is displayed on the display section 217. A user can intuitively make various settings, by using the menu screen displayed on the display section 217, a four-direction key which can be pressed in the up, down, left, and right directions, and a SET button.

A touch panel 221 is a touch panel which can detect a touch on the display section 217. The touch panel 221 and the display section 217 can be integrally formed. The system controller 250 can detect various operations performed on the touch panel 221. Various types of touch panels can be applied to the touch panel 221, such as a resistive type, a capacitive type, a surface acoustic wave type, an infrared type, an electromagnetic induction type, an image recognition type, and an optical sensor type. An external interface 233 is provided so as to connect the digital camera 100 and an external apparatus. In FIG. 2, the interface is denoted as "I/F". The external interface 233 may be a video input/output terminal, such as a composite video input/output terminal or an HDMI (registered trademark), or may be a USB interface or an interface for infrared or wireless communication. By connecting a pointing device, such as a mouse, to the external interface 233, it is possible to handle the pointing device as inputting means in place of the touch panel 221. In this case, the system controller 250 receives an input from the mouse connected to the external interface 233 and displays a pointer on the display section 217. Further, the system controller 250 receives movement and clicking of the mouse and performs control equivalent to that performed using the touch panel 221.

A power supply controller 225 is comprised of a battery detection circuit, a DC-DC converter, a switching circuit for switching between blocks to be energized, and detects attachment/detachment of a battery, a battery type, a battery remaining amount, and so forth. Further, the power supply controller 225 controls the DC-DC converter based on a result of the above-described detection and an instruction from the system controller 250 to supply required voltage to the components including the recording medium 232 for a required time period. A power supply section 226 is a power supply implemented by a primary battery, such as an alkaline battery and a lithium battery, a secondary battery, such as a NiCd battery, a NiMH battery, and a Li battery, an AC adapter, or the like.

A recording medium interface 231 is provided so as to connect to the recording medium 232, such as a memory card and a hard disk. The recording medium 232 records image data stored in the memory 220, metadata attached to image data, and so forth, and is implemented e.g. by a semi-conductor memory, an optical disk, and a magnetic disk. The data recorded in the recording medium 232 is read out by the recording medium interface 231 and transferred to the memory 220. As the method of recording metadata, a method compliant with the exchangeable image file format (Exif) standard can be applied to a still image, and a method compliant with the advanced video coding high definition (AVCHD) standard can be applied to a moving image. A communication section 234 performs communication with an external apparatus (such as the model generation server 102) wirelessly or by a wired cable. Video signals, voice signals, and so forth are transmitted and received via the communication section 234. The communication section 234 can also be connected to a wireless LAN (Local Area Network) and the Internet. The communication section 234 can transmit images (including through images) captured by the image capturing section 214 and images recorded in the recording medium 232. Further, the communication section 234 can receive image data and other various information from an external apparatus.

Next, the model generation server 102 will be described. The model generation server 102 includes a CPU 202, a ROM 203, a RAM 204, an HDD 205, an NIC 206, an input section 207, a display section 208, and a GPU 209, which are connected to each other via a system bus 201. The CPU 202 controls the overall operation of the model generation server 102. The ROM 203 stores programs executed by the model generation server 102 and various parameters. The RAM 204 temporarily stores programs and data which are supplied from an external apparatus via the network 101. The RAM 204 may temporarily store programs and data which are read out from the ROM 203. The programs loaded into the RAM 204 are executed by the CPU 202, whereby the processes performed by the model generation server 102 are realized.

The HDD 205 is a hard disk drive built in the model generation server 102. An optical disk, a magnetic card, an optical card, an IC card, or the like, may be used in place of the HDD 205. The NIC 206 is a network interface card used to connect to a communication line, such as the network 101. The input section 207 receives an operation performed by a user using an input device, such as a pointing device and a keyboard for inputting various data. The display section 208 is an interface with a display device (such as a display) for displaying data held by the model generation server 102 and supplied data. The display section 208 may be not an interface, but a display device. The GPU 209 is capable of performing a lot of processing operations in parallel and can perform calculation at high speed. The GPU 209 is mostly used for a display function, but is also suitably used e.g. for deep learning processing.

Figure 3:
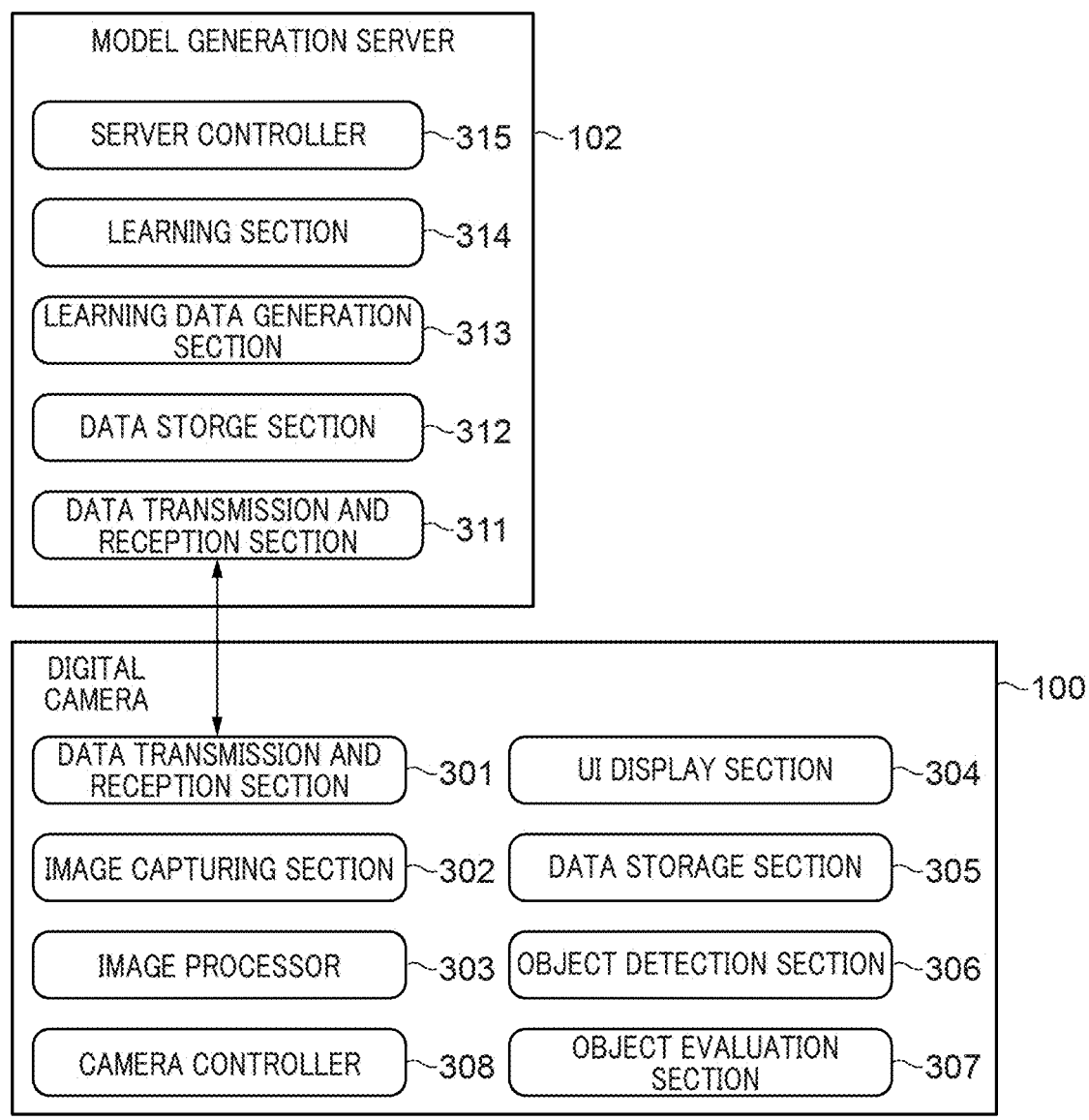
FIG. 3 is a functional block diagram of a model generation server and a digital camera.

FIG. 3 is a functional block diagram of the model generation server 102 and the digital camera 100. The digital camera 100 includes a data transmission and reception section 301, an image capturing section 302, an image processor 303, a UI display section 304, a data storage section 305, an object detection section 306, an object evaluation section 307, and a camera controller 308. The data transmission and reception section 301 transmits image data photographed by the digital camera 100 and information on a user instruction received via the operation section 227 to the model generation server 102. Further, the data transmission and reception section 301 receives various data transmitted from the model generation server 102. The data transmission and reception section 301 corresponds e.g. to the communication section 234. The image capturing section 302 acquires information on the outside of the digital camera 100 as optical information and converts the acquired information to image data. The image capturing section 302 corresponds e.g. to the image capturing section 214.

The image processor 303 performs image processing on image data converted by the image capturing section 302 and adds additional information (such as metadata) to the image data. The image processor 303 corresponds e.g. to the image processor 219. The UI display section 304 displays a user interface used on the operation section 227 and displays various information and so forth. The UI display section 304 corresponds e.g. to the display section 217 and the touch panel 221. The data storage section 305 stores parameters of various learning models used by the object evaluation section 307 and image data captured by the image capturing section 302. The data storage section 305 is realized e.g. by the system memory 229, the memory 220, the recording medium 232, or the like.

The object detection section 306 inputs an image captured by the image capturing section 302 to an object detection model 401, described hereinafter, to thereby detect objects included in the image. The object evaluation section 307 inputs an object image including the objects detected by the object detection section 306 to an object evaluation model 402, described hereinafter, to thereby calculates an evaluation value of each object. The object detection section 306 and the object evaluation section 307 are implemented e.g. by the system controller 250 and a dedicated processor, such as a GPU, built in the digital camera 100. The camera controller 308 performs various controls for the digital camera 100 of the present embodiment. The camera controller 308 corresponds e.g. to the system controller 250.

Next, the model generation server 102 will be described. The model generation server 102 includes a data transmission and reception section 311, a data storage section 312, a learning data generation section 313, a learning section 314, and a server controller 315. The data transmission and reception section 311 receives various data including image data, a request for relearning a learning model applied to the object evaluation section 307, or the like, from the digital camera 100. Further, the data transmission and reception section 311 transmits various data, such as parameters of a learning model, to the digital camera 100. The data transmission and reception section 311 corresponds e.g. to the NIC 206.

The data storage section 312 stores teacher data used when the learning section 314 performs machine learning, image data received from the digital camera 100, feature values of the image data, and so forth. The data storage section 312 is realized by the RAM 204, the HDD 205, or the like. The learning data generation section 313 generates a learning data set used by the learning section 314 to perform machine learning, based on various data including image data received from the digital camera 100. The generated learning data set is stored in the data storage section 312. The learning section 314 performs machine learning of a learning model using a lot of learning data sets stored in the data storage section 312. In the present embodiment, the learning section 314 performs machine learning of the two learning models of the object detection model 401 and the object evaluation model 402. As the object detection model 401 and the object evaluation model 402, learning models which have already been learned are used. Further, the learning section 314 performs relearning of the object evaluation model 402 based on a relearning request received from the digital camera 100.

Note that in the present embodiment, it is assumed that the machine learning performed by the learning section 314 is machine learning (deep learning) of a neural network. However, the learning section 314 may perform machine learning of a learning model by a machine learning method, such as a support vector machine or a decision tree. The machine learning performed by the learning section 314 may be performed by the CPU 202 or the GPU 209, or may be performed by a cooperative operation of the CPU 202 and the GPU 209. When the machine learning of a learning model is performed, a large amount of calculation processing is performed, and hence it is preferable to use the GPU 209. The server controller 315 performs various controls of the model generation server 102 of the present embodiment. The server controller 315 corresponds e.g. to the CP 202.

Figure 4A:
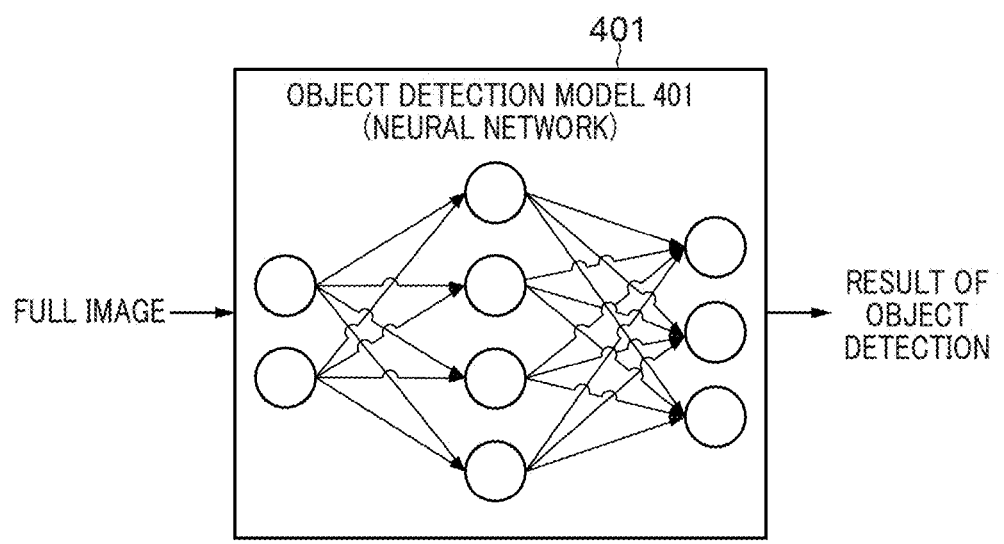
FIGS. 4A and 4B are diagrams each showing input and output of a learning model.
Figure 4B:
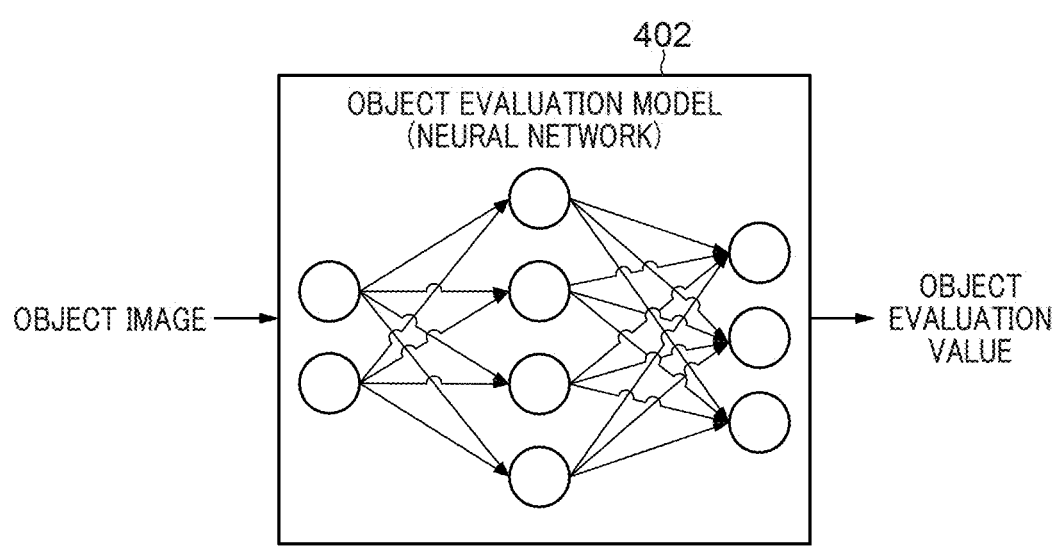

FIGS. 4A and 4B are diagrams each showing input and output of the object detection model 401 and the object evaluation model 402. In the illustrated examples in FIGS. 4A and 4B, the object detection model 401 and the object evaluation model 402 are learning models of a neural network, but learning models other than those of a neural network may be used.

First, the machine learning of the object detection model 401 shown in FIG. 4A will be described. In the machine learning of the object detection model 401 as the detection unit, a learning data set of image data and teacher data is used. FIGS. 5A and 5B are diagrams each showing an example of learning data sets, and FIG. 5A shows an example of the learning data sets each used when the machine learning of the object detection model 401 is performed. A correct answer label as the teacher data is associated with each image (image data) appearing in FIG. 5A. The image data used for the machine learning of the object detection model 401 is a whole image (full image) for learning. As the image data for learning, image data captured by the digital camera 100, for example, may be used, or image data stored in the model generation server 102 in advance may be used. Further, the model generation server 102 may acquire the image data for learning from an external apparatus.

The example in FIG. 5A shows six learning data sets (Data 1 to Data 6) as the learning data sets. In the present embodiment, an object to be detected is assumed to be a person (such as a living person). Therefore, the teacher data of a learning data set of which the image data includes an object of a person has a correct answer label set to a value of 1. On the other hand, the teacher data of the learning data set of which the image data includes no object of a person has a correct answer label set to a value of 0. For example, in a case where image data includes a picture or a poster on which a person has been drawn, or a statue having a human shape as a stereoscopic model, or the like, but does not include a person, the teacher data associated therewith has a correct answer label which is set to a value of 0. The image data associated with the teacher data having a correct answer label set to a value of 0 is image data which is not a target of object detection, and the image data associated with the teacher data having a correct answer label set to a value of 1 is image data which is a target of object detection.

The learning section 314 of the model generation server 102 performs the machine learning of the object detection model 401 using the above-mentioned learning data sets. Although the number of learning data sets to be used may be set as desired, it is set to e.g. several thousands to several tens of thousands. By repeatedly performing the machine learning of the object detection model 401, the parameters of the object detection model 401 are properly adjusted such that an error of an output from the object detection model 401 becomes small. For example, the learning section 314 repeatedly performs the machine learning until the above-mentioned error becomes not larger than a predetermined value.

When unknown image data (full image) is input to the object detection model 401 which has been machine-learned as described above, the object detection model 401 performs inference on the unknown image data. Then, the object detection model 401 outputs a result of object detection by expressing a detected object of a person using a value in a range of 0 to 1. This value indicates a probability that the detected object is a person. The object detection model 401 may detect an object having a probability not lower than a predetermined value.

Next, the object evaluation model 402 shown in FIG. 4B will be described. The object evaluation model 402 as an evaluation unit is a learning model on which machine learning is performed. In the present embodiment, the learning data sets shown in FIG. 5B are used for the machine learning of the object evaluation model 402. As shown in FIG. 5B, the image data for learning used for the machine learning of the object evaluation model 402 is not a full image, but a partial object image including an object area. Further, as the teacher data, feature values 1 to 3 are used. The feature values 1 to 3 can be identified based on luminance information, color information, and so forth of the image data for learning, in FIG. 5B. For example, the feature value 1 indicates gloss of hair, the feature value 2 indicates a shade of a face, and the feature value 3 indicates brightness of a pupil. The feature values 1 to 3 are each set to a value in a range of 0 to 1 e.g. by a user. The values of the feature values 1 to 3 each indicate likelihood of a feature value with respect to an object included in an object image. The feature values of each learning data set are not limited to the example shown in FIG. 5B.

The model generation server 102 performs the machine learning of the object evaluation model 402 using the learning data sets as shown in FIG. 5B. This properly adjusts the parameters of the object evaluation model 402. When an unknown object image is input to the object evaluation model 402 which has been machine-learned as described above, the object evaluation model 402 performs inference, and outputs a value in a range of 0 to 1 as an evaluation value. The evaluation value indicates a probability associated with each of the feature values. When an unknown object image is input to the object evaluation model 402 which has been machine-learned, the object evaluation model 402 outputs an evaluation value associated with each of the feature values.

As to the above description, the learning data sets used for the machine learning of the object detection model 401 and the object evaluation model 402 may be set by a user or may be obtained from a result of the machine learning performed by the learning section 314. For example, the learning section 314 may perform the machine learning of the object detection model 401 using the learning data sets as shown in FIG. 5A, and the learning data generation section 313 may obtain the feature values examples of which are show in FIG. 5B by analyzing the output values from the machine-learned object detection model 401.

In the present embodiment, the machine learning of the object detection model 401 and the object evaluation model 402 are performed by the learning section 314 of the model generation server 102. Then, the digital camera 100 acquires the learned object detection model 401 and object evaluation model 402 from the model generation server 102. The digital camera 100 stores the acquired learned object detection model 401 and object evaluation model 402 in the data storage section 305. The object detection section 306 of the digital camera 100 performs inference using the learned object detection model 401 stored in the data storage section 305. Further, the object evaluation section 307 performs inference using the learned object evaluation model 402 stored in the data storage section 305. For the object evaluation model 402, the learned parameters are updated by relearning. Details of this point will be described hereinafter. Further, the digital camera 100 and the model generation server 102 may be provided, not as separate apparatuses, but as an integrated apparatus.

Figure 6:
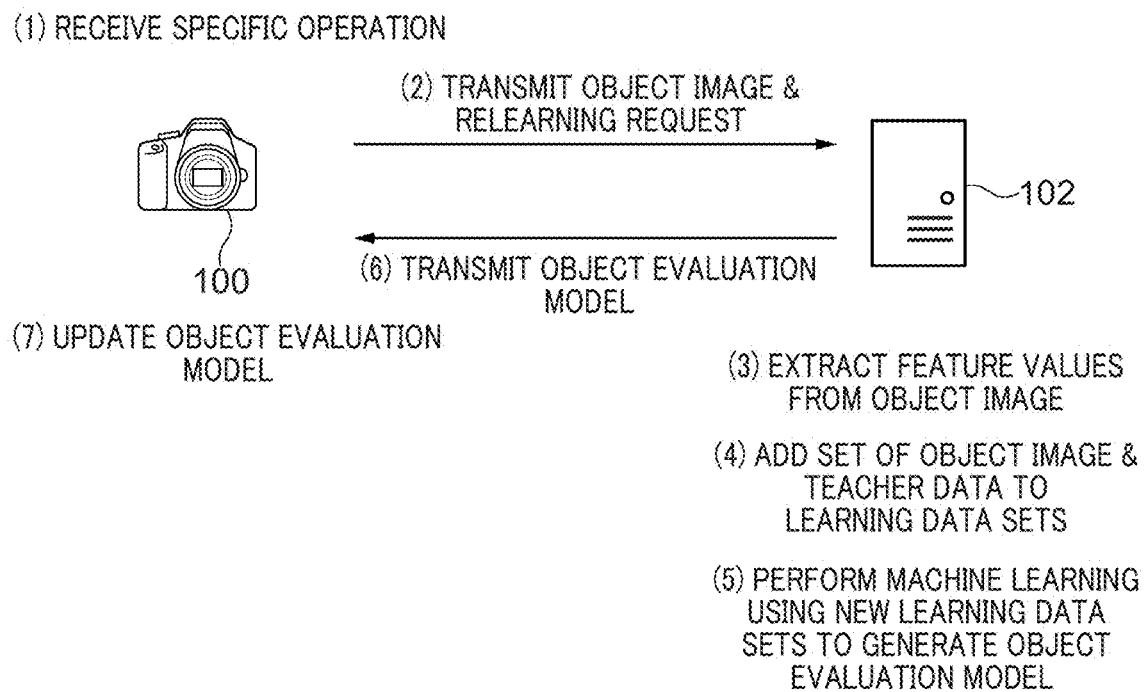
FIG. 6 is a diagram showing a flow of the operation of the entire system, for updating an object evaluation model 402.

Next, the operation of the entire system for updating the object evaluation model 402 will be described. FIG. 6 is a diagram showing a flow of the operation of the entire system for updating the object evaluation model 402. First, while the digital camera 100 is in a power-on state, the object detection section 306 detects an object using image data captured by the image capturing section 302 as an input. The object evaluation section 307 calculates and outputs evaluation values of feature values using the object image including the detected object as an input. The system controller 250 determines whether or not each output evaluation value satisfies a predetermined criterion. The predetermined criterion refers to a criterion for executing a specific function. For example, when an evaluation value output from the object evaluation section 307 is not smaller than a predetermined threshold value, the system controller 250 may determine that the above-mentioned predetermined criterion is satisfied. The predetermined threshold value may be set to a desired value.

In the present embodiment, the above-described specific function is assumed to be the smile shutter function for performing photographing when a person as an object is smiling. However, the specific function is not limited to the smile shutter function. If it is determined that the predetermined criterion is satisfied, the system controller 250 stores the image data captured by the image capturing section 302 in the data storage section 305. Here, as a step (1) in FIG. 6, the system controller 250 determines whether or not a specific operation has been received from the user via the UI display section 304. Examples of the specific operation include an operation for excluding a detected object from objects, an operation for deleting stored image data, and an operation for disabling the smile shutter function. These specific operations are operations associated with the specific function. If a specific operation is received, the system controller 250 performs control for transmitting an object image of an area including the detected object out of the image data stored in the data storage section 305 and a relearning request to the model generation server 102. Accordingly, the data transmission and reception section 301 transmits the object image and the relearning request to the model generation server 102, as a step (2) in FIG. 6. In doing this, the data transmission and reception section 301 may further transmit the evaluation values to the model generation server 102.

The learning data generation section 313 of the model generation server 102 extracts feature values of the object extracted from the received object image, as a step (3) in FIG. 6. Then, the learning data generation section 313 sets a predetermined value for each extracted feature value as a correct answer label. The predetermined value is 0 or 1. Then, as a step (4) in FIG. 6, the learning data generation section 313 sets the received object image as the image data for learning, sets the correct answer label set for the extracted feature value as the teacher data, and adds the set image data for learning and teacher data to the learning data sets which have already been stored in the data storage section 312. This generates learning data sets to which the learning data set of the new image data for learning and teacher data is added. The learning section 314 performs relearning of the object evaluation model 402 using the newly generated learning data sets. As a step (5) in FIG. 6, the learning section 314 performs relearning of the object evaluation model 402 using the newly generated learning data sets. The learning section 314 performs relearning of the object evaluation model 402, whereby the parameters of the object evaluation model 402 are generated. At this time, the learning section 314 may perform the machine learning of the object detection model 401 using the latest learning data sets.

The data transmission and reception section 301 transmits the relearned object evaluation model 402 to the digital camera 100, as a step (6) in FIG. 6. Further, the data transmission and reception section 301 may transmit the machine-learned object detection model 401 to the digital camera 100. The camera controller 308 replaces the object evaluation model 402 stored in the data storage section 305 by the received object evaluation model 402, as a step (7) in FIG. 6. As a result, the object evaluation model 402 stored in the digital camera 100 is updated.

Next, a flow of a process performed by the digital camera 100 will be described. FIG. 7 is a flowchart of the process performed by the digital camera 100. In a step S701, the system controller 250 determines whether or not the updated object evaluation model 402 has been received from the model generation server 102. If the answer to the question of the step S701 is affirmative (YES), the system controller 250 proceeds to a step S702. In the step S702, the system controller 250 updates the object evaluation model 402 stored in the digital camera 100 to the received new object evaluation model 402. At this time, the system controller 250 may control whether or not to update the object evaluation model 402 based on a user operation.

Figure 8A:
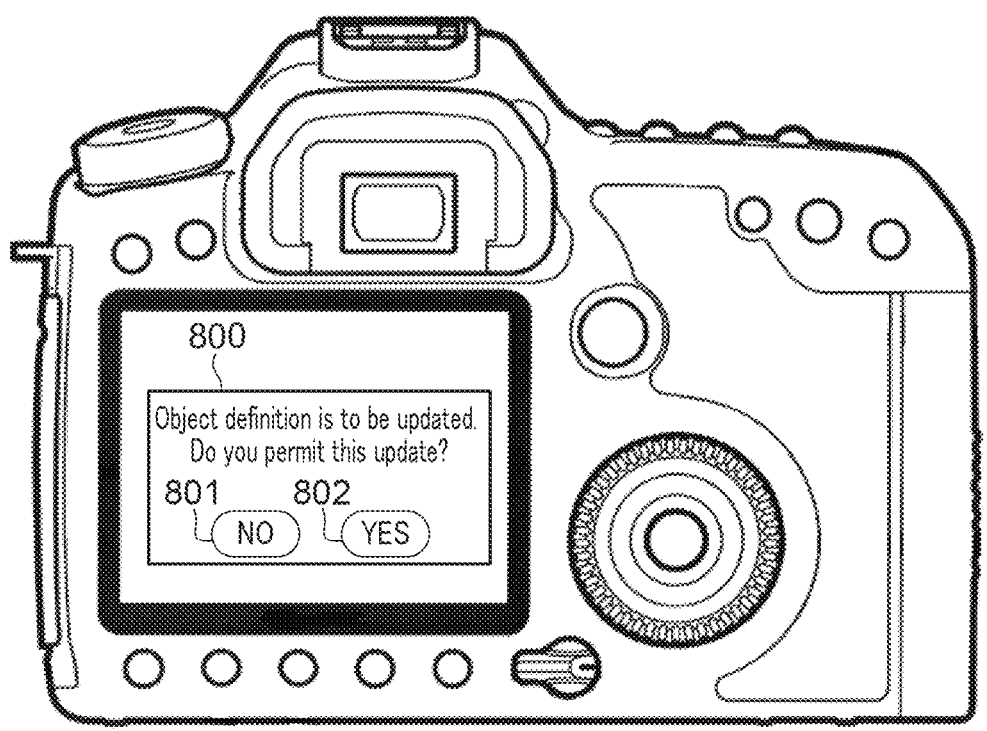
FIGS. 8A and 8B are diagrams each showing an example of a UI display.
Figure 8B:
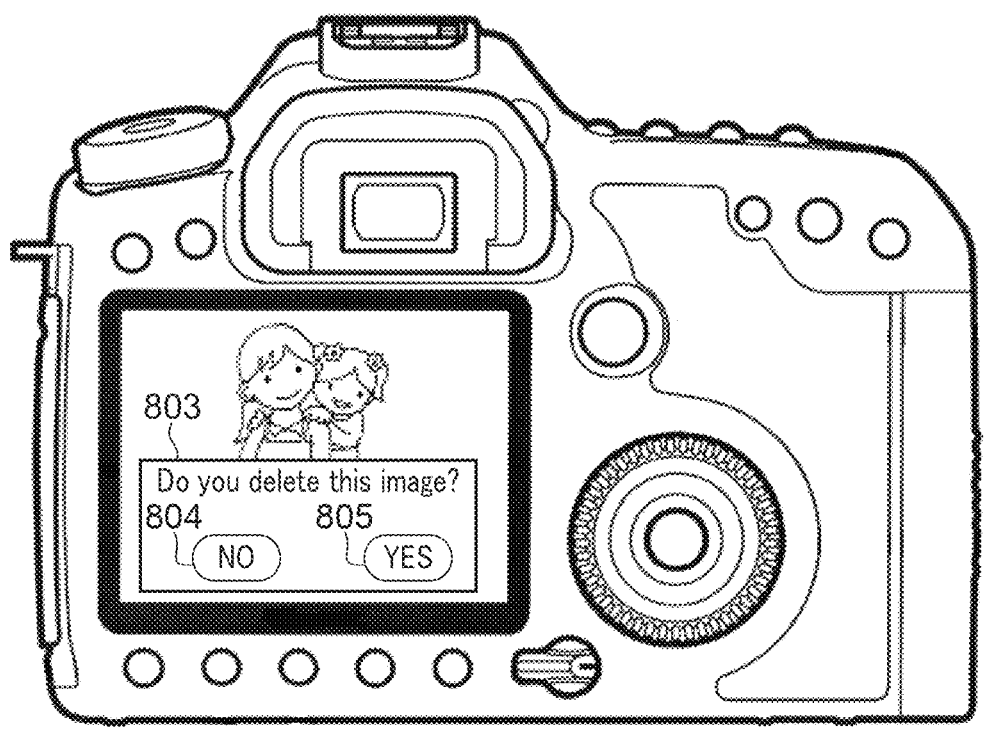

FIGS. 8A and 8B are diagrams each showing an example of UI display. Before execution of the step S702, the system controller 250 may display the UI (user interface) shown in FIG. 8A on the UI display section 304. A pop-up window 800 for asking whether or not to update the object evaluation model 402, in other words, for prompting a user to permit this update is displayed on the UI display section 304. The pop-up window 800 includes a NO button 801 and a YES button 802. In a case where the NO button 801 is pressed, the system controller 250 abandons the received object evaluation model 402 without updating the object evaluation model 402. On the other hand, in a case where the YES button 802 is pressed, the system controller 250 updates the object evaluation model 402.

Referring again to FIG. 7, if the answer to the question of the step S701 is negative (NO), or after the step S702 is executed, the system controller 250 proceeds to a step S703. In the step S703, the system controller 250 inputs the image signals acquired from the image capturing section 302 to the image processor 303 to perform development for converting the image signals to image data and thereby acquires the image data. In a step S704, the system controller 250 inputs the image data to the object detection model 401 and determines whether or not an object has been detected by the object detection model 401. If it is determined that an object has been detected by the object detection model 401, the system controller 250 determines that the answer to the question of the step S704 is affirmative (YES) and proceeds to a step S705. On the other hand, if the object detection section 306 determines that no object has been detected, the system controller 250 determines that the answer to the question of the step S704 is negative (NO) and returns to the step S701.

In the step S705, the system controller 250 determines whether or not the specific function is enabled. The specific function is the above-described specific function and depends on a state of an object. As described above, the specific function is the smile shutter function for analyzing facial expression of a person as an object and performing photographing in a case where the person is smiling. If it is determined that the specific function is enabled, the system controller 250 determines that the answer to the question of the step S705 is affirmative (YES) and proceeds to a step S706. On the other hand, if it is determined that the specific function is not enabled, the system controller 250 determines that the answer to the question of the step S705 is negative (NO) and returns to the step S701.

In the step S706, the system controller 250 inputs the object image including an area of the detected object to the object evaluation model 402 to evaluate the object of the object image. When the object image is input to the object evaluation model 402, the object evaluation model 402 outputs respective evaluation values of the feature values.

In a step S707, the system controller 250 determines whether or not the evaluation values output from the object evaluation section 307 satisfy a predetermined criterion. In the present embodiment, it is assumed that there are a plurality of types of evaluation values. However, the evaluation value may be of a single type. For example, the evaluation values are evaluation values of the feature value 1 (gloss of hair), the feature value 2 (shade of a face), and the feature value 3 (brightness of a pupil), appearing in FIG. 5B, respectively. Each evaluation value is expressed by a value in a range of 0 to 1. The predetermined criterion is set in advance as a predetermined threshold value in association with each of the evaluation values. In a case where one or a plurality of evaluation values out of the three evaluation values output from the object evaluation section 307 is/are not smaller than the associated predetermined threshold value, the system controller 250 may determine that the evaluation values satisfy the predetermined criterion.

Here, the object detection model 401 detects one or more objects from the image data (full image). Although the description is given assuming that the object detection model 401 detects a plurality of objects, the object detection model 401 may detect one object. FIG. 9 is a diagram showing an example of predetermined criterions associated with a plurality of functions, respectively. For example, in a case where the specific function is the smile shutter function, the object is a person. Therefore, the system controller 250 determines whether or not the evaluation value satisfies the predetermined criterion based on whether or not the evaluation values of e.g. gloss of hair and brightness of a pupil are not smaller than the predetermined threshold values associated therewith. For example, the system controller 250 determines an object satisfying two determination parameters associated with the smile shutter function, appearing in FIG. 9, as an object having the evaluation values satisfying the predetermined criterion. However, the determination of whether or not the evaluation values satisfy the predetermined criterion is not limited to the example shown in FIG. 9.

Referring again to FIG. 7, if it is determined that the evaluation values of the object satisfy the predetermined criterion, the system controller 250 determines that the answer to the question of the step S707 is affirmative (YES) and proceeds to a step S709. On the other hand, if it is determined that there is an object whose evaluation values do not satisfy the predetermined criterion, the system controller 250 determines that the answer to the question of the step S707 is negative (NO) and proceeds to a step S708. In the step S708, the system controller 250 excludes the object whose evaluation values do not satisfy the predetermined criterion from a target of execution of the specific function. By executing the steps S707 and S708, the system controller 250 identifies an object satisfying the predetermined criterion related to execution of the specific function, out of one or more objects detected from the image data.

For example, let it be assumed that an actual person, a poster on which a person has been drawn, and a formed object of a person are included in an object image. In this case, the two objects of the poster on which a person has been drawn and the formed object of a person have a high possibility that it is determined that the evaluation values do not satisfy the predetermined criterion based on the evaluation values of gloss of hair and brightness of a pupil. On the other hand, the object of the actual person has a high possibility that it is determined that the evaluation values satisfy the predetermined criterion based on the evaluation values of gloss of hair and brightness of a pupil. In this case, the system controller 250 excludes the poster on which a person has been drawn and the formed object of a person from the target of execution of the specific function. That is, the system controller 250 can identify an object satisfying the predetermined criterion related to execution of the specific function, such as the smile shutter function.

In the step S709, the system controller 250 determines whether or not the object satisfies the execution condition of the specific function. In a case where the system controller 250 executes the step S708, the object which is a target of the determination of the step S709 is an object which has not been excluded. The execution condition of the specific function depends on a state of an object. For example, in a case where the specific function is the smile shutter function, the system controller 250 determines whether or not an object as a determination target is smiling. At this time, the system controller 250 may determine that the object satisfies the execution condition of the specific function in a case where a curve near the outer corner of each eye or a curve of lips of the object (person) as the determination target exceeds a certain criterion. In a case where the specific function is a function other than the smile shutter function, the system controller 250 performs the determination of the step S709 based on another determination index associated therewith. Even in a case where the specific function is the smile shutter function, the system controller 250 may perform the determination of the step S709 based on a determination index which is different from the above-mentioned determination index.

If the answer to the question of the step S709 is negative (NO), there is no object satisfying the execution condition of the specific function, and hence the system controller 250 returns to the step S701. On the other hand, if the answer to the question of the step S709 is affirmative (YES), there is an object satisfying the execution condition of the specific function, and hence the system controller 250 proceeds to a step S710. In the step S710, the system controller 250 develops the image signals acquired from the image capturing section 302 into image data and stores the image data in the recording medium 232, the nonvolatile memory 228, or the like.

Next, in a step S711, the system controller 250 determines, after storing the image data, whether or not an operation for changing the object as a target has been received. The operation for changing the object is a specific operation and is performed by a user e.g. via the UI display section 304. The operation for changing the object is e.g. an operation for reselecting or excluding an object displayed on the UI display section 304. Further, the operation for changing the object may be e.g. an operation for deleting stored image data or an operation for disabling the specific function. FIG. 8B shows an example of the UI screen. On the UI screen shown in FIG. 8B, a pop-up window 803 for prompting a user to determine whether or not to delete image data is displayed. The pop-up window 803 includes a NO button 804 and a YES button 805. For example, in a case where the YES button 805 is pressed, image data being displayed (selected image data) is deleted. Deletion of image data may be executed e.g. in a case where a button of the digital camera 100, which is assigned to an image deletion function, is pressed.

If the answer to the question of the step S711 is affirmative (YES), the system controller 250 proceeds to a step S712. On the other hand, if the answer to the question of the step S711 is negative (NO), the system controller 250 proceeds to a step S713. In the step S712, the system controller 250 performs control for transmitting a relearning request, the object image used in the step S706, and the evaluation values output from the object evaluation model 402 to the model generation server 102. With this, the relearning request, the object image, and the evaluation values are transmitted to the model generation server 102. In the step S713, the system controller 250 performs control for transmitting the object image used in the step S706 and the evaluation values output from the object evaluation model 402 to the model generation server 102. At this time, the system controller 250 performs the control so as not to transmit a relearning request. Thus, the process performed by the digital camera 100 is terminated. Note that in the steps S712 and S713, the evaluation values are not necessarily required to be transmitted. In this case, the CPU 202 of the model generation server 102 analyzes the received object image and calculates the evaluation values.

Figure 10:
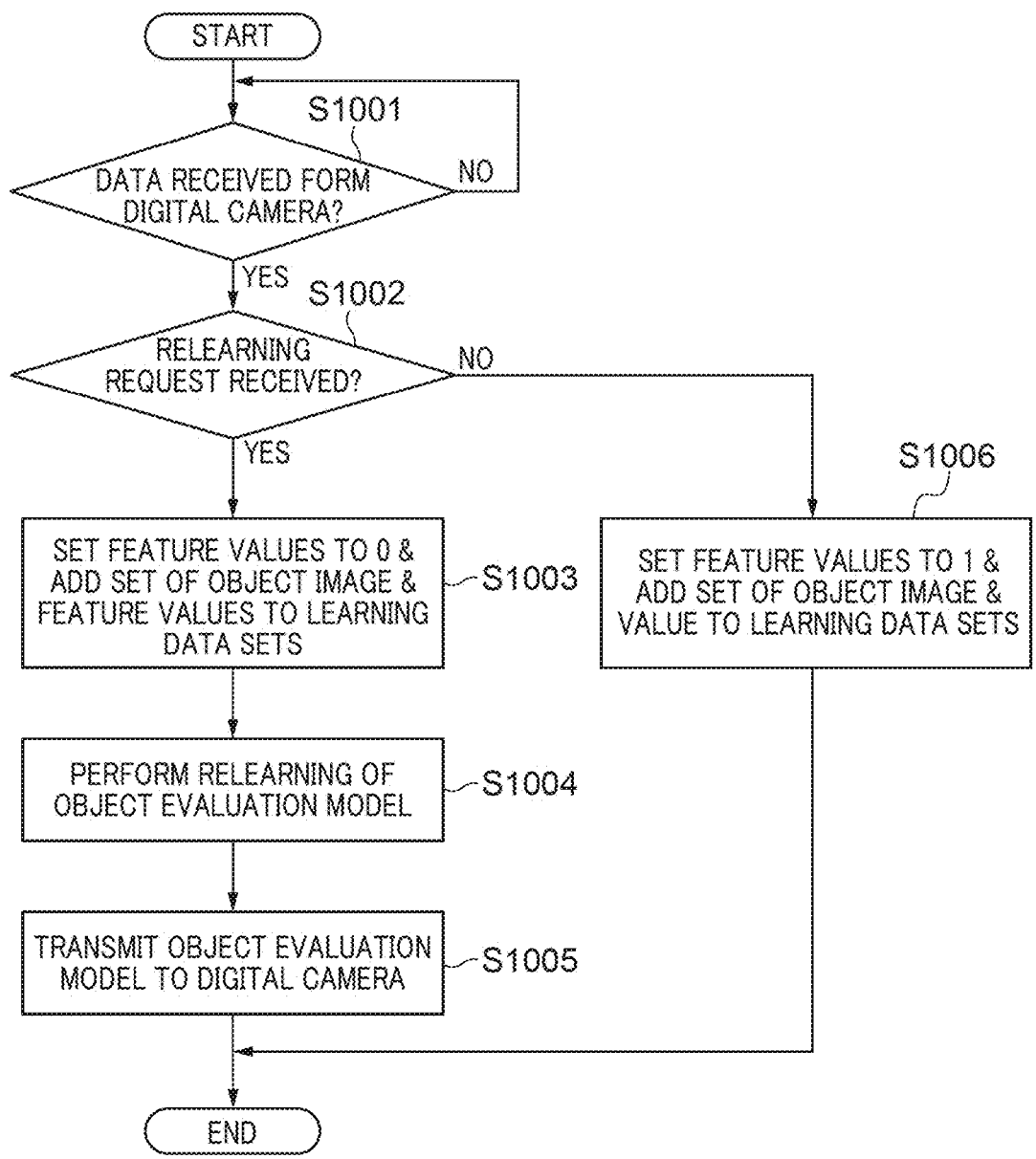
FIG. 10 is a flowchart of a process performed by the model generation server.

Next, a flow of a process performed by the model generation server 102 will be described. FIG. 10 is a flowchart of the process performed by the model generation server 102. In a step S1001, the CPU 202 determines whether or not data, such as an object image, has been received from the digital camera 100. If the answer to the question of the step S1001 is negative (NO), the CPU 202 returns to the step S1001 and remains on standby until data is received from the digital camera 100. On the other hand, if the answer to the question of the step S1001 is affirmative (YES), the CPU 202 proceeds to a step S1002.

In the step S1002, the CPU 202 determines whether or not a relearning request is included in the data received from the digital camera 100. If the answer to the question of the step S1002 is affirmative (YES), the CPU 202 proceeds to a step S1003. On the other hand, if the answer to the question of the step S1002 is negative (NO), the CPU 202 proceeds to a step S1006. In the step S1003, the CPU 202 adds a set of the object image received from the digital camera 100 and the feature values associated with the object image, which are set to the predetermined value of 0, to the learning data sets. As described above, in a case where the operation for changing the object is performed, the digital camera 100 transmits a relearning request to the model generation server 102. Therefore, in the step S1003, the CPU 202 adds the set of the object image and the feature values set to 0 to the learning data sets. That is, the object of the received object image becomes an incorrect answer with respect to execution of the specific function. Thus, the learning data sets are updated.

In a step S1004, the CPU 202 causes the learning section 314 to perform machine learning using the updated learning data sets. With this, the machine learning (relearning) of the object evaluation model 402 is performed using the updated learning data sets. At this time, relearning of the object evaluation model 402 may be performed by using all of the learning data sets already stored in the HDD 205 or the like. Further, relearning of the object evaluation model 402 may be performed by causing parameters generated by performing machine learning using the updated learning data sets to be reflected on the learned parameters.

In a step S1005, the CPU 202 performs control for transmitting the relearned object evaluation model 402 to the digital camera 100. With this, the relearned object evaluation model 402 is transmitted to the digital camera 100. In the step S1006, the CPU 202 adds the set of the object image received from the digital camera 100 and the feature values associated with the object image, which are set to the predetermined value of 1, to the learning data sets. Since a relearning request has not been received, the CPU 202 sets the feature values associated with the object image to 1. This terminates the process performed by the model generation server 102.

As described above, in the present embodiment, when the digital camera 100 executes a specific function, an object is excluded of which evaluation values associated with detected object feature values do not satisfy the predetermined criterion. With this, it is possible to improve the object detection performance exhibited when performing photographing using a specific function, such as the smile shutter function, and suppress erroneous recognition of an object. As a result, it is possible to prevent photographing using a specific function, such as the smile shutter function, which is executed due to erroneous recognition of an object. That is, it is possible to prevent photographing which is not intended by a user. For example, even when a face of a person, which is printed on a poster, or a three-dimensionally formed object of a person is included in a photographing range of the digital camera 100, it is not recognized as an object of the photographing using the smile shutter function, and hence it is possible to prevent photographing not intended by a user. Further, since relearning of the object evaluation model 402 is performed based on a user operation, it is possible to perform object detection intended by a user and improve the user operability.

Although in the above-described embodiment, as the feature values used for evaluation of an object, gloss of hair, a shade of a face, and brightness of a pupil are described, any other element may be used for the feature values used for evaluation of an object. For example, a state of downy hair on a face, presence/absence of a mole, a blood vessel line, hangnail of a hand, wrinkles of a skin, presence/absence of makeup, etc., may be used for the feature values used for evaluation of an object. Further, feature values extracted with respect to a change in object (such as a change in expression of a face and movement of arms and legs) based on a difference between image data items captured temporally sequentially, may be used for evaluation of an object. Further, the feature values used for evaluation of an object may be extracted from information obtained from a function equipped in the digital camera 100 or information which can be acquired from an external apparatus connected to the external interface 233. For example, information on a distance to an object, GPS information of the current position, temperature information of an object, information on outside air temperature, etc., may be used for the feature values used for evaluation of an object.

Further, although in the above-described embodiment, the object detection model 401 and the object evaluation model 402 are used for the object detection section 306 and the object evaluation section 307 by way of example, it is not necessarily required to use the learning models for the object detection section 306 and the object evaluation section 307. For example, the object detection section 306 and the object evaluation section 307 may be realized by the system controller 250 that executes rule-based programs. Further, the object detection section 306 may perform rule-based object detection, and the object evaluation section 307 may perform evaluation using the object evaluation model 402.

Further, although in the above-described embodiment, the smile shutter function is applied as the specific function, by way of example, the object evaluation model 402 can be commonly used for a plurality of different functions. For example, the object evaluation model 402 can be commonly used for various functions, such as a function of a group photo mode in which photographing is performed when a certain number of objects gather, and a function of a tracking mode for photographing while steadily gazing at an object, which is introduced in a monitoring camera system or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-125733, filed Jul. 22, 2020, which is hereby incorporated by reference herein in its entirety.

What is claimed is:

1. An electronic device comprising:
a detection unit configured to detect one or more objects from image data;
an evaluation unit configured to evaluate feature values of the one or more detected objects;
an identification unit configured to identify an object out of the one or more objects, that satisfies a predetermined criterion related to execution of a specific function, based on a result of the evaluation; and
a control unit configured to perform control for executing the specific function in a case where it is determined that the identified object satisfies an execution condition of the specific function,
wherein detection of the one or more objects from the image data is performed by using a detection learning model which has been machine-learned using a plurality of detection learning data sets, each detection learning data set including image data for detection learning and feature values as teacher data, and
wherein the image data for detection learning included in at least one detection learning data set of the plurality of detection learning data sets includes a statue having a human shape as a stereoscopic model, as image data which is not a target of objection detection, but does not include a person, to be used in machine learning of the detection learning model.

2. The electronic device according to claim 1, wherein evaluation of the feature values is performed by an evaluation learning model which has been machine-learned using a plurality of evaluation learning data sets each including image data for learning and feature values as teacher data.

3. The electronic device according to claim 1, wherein in a case where a specific operation concerning an object is received, the control unit requests the evaluation unit to execute relearning of the evaluation learning model.

4. The electronic device according to claim 3, wherein the specific operation is an operation for excluding one of the one or more detected objects.

5. The electronic device according to claim 3, wherein the specific operation is an operation for deleting image data including the detected object.

6. The electronic device according to claim 3, wherein the specific operation is an operation for disabling the specific function.

7. The electronic device according to claim 3, wherein the relearning is performed on the evaluation learning model by adding image data associated with the specific operation and feature values set to a predetermined value, which have been transmitted together with the relearning request.

8. The electronic device according to claim 7, wherein in a case where the relearned evaluation learning model is received, the control unit performs control for displaying a screen for prompting a user to permit update of the evaluation learning model to the received evaluation learning model.

9. The electronic device according to claim 8, wherein in a case where the update is not permitted, the relearned evaluation learning model is abandoned.

10. The electronic device according to claim 2, wherein the evaluation learning model is commonly used for evaluation of feature values related to a plurality of the specific functions different from each other.

11. The electronic device according to claim 1, wherein the feature values of the object are one or a combination of gloss of hair, a shade of a face, brightness of a pupil, a state of downy hair on a face, presence/absence of a mole, a blood vessel line, hangnail of a hand, wrinkles of a skin, presence/absence of makeup, GPS information, temperature information of an object, and information on outside air temperature.

12. The electronic device according to claim 1, wherein the feature values of the object are feature values of a change in object based on a difference between sequential items of the image data.

13. An image capturing apparatus including:
an image capturing section; and
an electronic device, the electronic device comprising:
a detection unit configured to detect one or more objects from image data;
an evaluation unit configured to evaluate feature values of the one or more detected objects;
an identification unit configured to identify an object out of the one or more objects, that satisfies a predetermined criterion related to execution of a specific function, based on a result of the evaluation; and
a control unit configured to perform control for executing the specific function in a case where it is determined that the identified object satisfies an execution condition of the specific function,
wherein detection of the one or more objects from the image data is performed by using a detection learning model which has been machine-learned using a plurality of detection learning data sets, each detection learning data set including image data for detection learning and feature values as teacher data, and
wherein the image data for detection learning included in at least one detection learning data set of the plurality of detection learning data sets includes a statue having a human shape as a stereoscopic model, as image data which is not a target of objection detection, but does not include a person, to be used in machine learning of the detection learning model.

14. A method of controlling an electronic device, comprising:
detecting one or more objects from image data;
evaluating feature values of the one or more detected objects;
identifying an object out of the one or more objects, that satisfies a predetermined criterion related to execution of a specific function, based on a result of the evaluation; and
performing control for executing the specific function in a case where it is determined that the identified object satisfies an execution condition of the specific function,
wherein detection of the one or more objects from the image data is performed by using a detection learning model which has been machine-learned using a plurality of detection learning data sets, each detection learning data set including image data for detection learning and feature values as teacher data, and
wherein the image data for detection learning included in at least one detection learning data set of the plurality of detection learning data sets includes a statue having a human shape as a stereoscopic model, as image data which is not a target of objection detection, but does not include a person, to be used in machine learning of the detection learning model.

15. A non-transitory computer-readable storage medium storing a program for causing a computer to execute a method of controlling an electronic device, the method comprising:
- detecting one or more objects from image data;
- evaluating feature values of the one or more detected objects;
- identifying an object out of the one or more objects, that satisfies a predetermined criterion related to execution of a specific function, based on a result of the evaluation; and
- performing control for executing the specific function in a case where it is determined that the identified object satisfies an execution condition of the specific function,
- wherein detection of the one or more objects from the image data is performed by using a detection learning model which has been machine-learned using a plurality of detection learning data sets, each detection learning data set including image data for detection learning and feature values as teacher data, and
- wherein the image data for detection learning included in at least one detection learning data set of the plurality of detection learning data sets includes a statue having a human shape as a stereoscopic model, as image data which is not a target of objection detection, but does not include a person, to be used in machine learning of the detection learning model.

* * * * *